United States Patent [19]

Buelens et al.

[11] Patent Number: 5,219,418
[45] Date of Patent: Jun. 15, 1993

[54] LIGHT-TIGHT CASSETTE

[75] Inventors: Edward Buelens, Kontich; Jozef L. Van Engeland, St. Katelijne-Waver, both of Belgium

[73] Assignee: Agfa-Gevaert N. V., Mortsel, Belgium

[21] Appl. No.: 963,510

[22] Filed: Oct. 20, 1992

Related U.S. Application Data

[63] Continuation of Ser. No. 670,020, Mar. 15, 1991, abandoned.

[30] Foreign Application Priority Data

Mar. 21, 1990 [EP] European Pat. Off. ........ 90200669.1

[51] Int. Cl.$^5$ .............................................. G03B 17/26
[52] U.S. Cl. ................................... 206/409; 242/71.1
[58] Field of Search ............... 206/409, 389, 408, 416; 242/71.1; 354/275

[56] References Cited

U.S. PATENT DOCUMENTS

| | | | |
|---|---|---|---|
| 4,034,929 | 7/1977 | Ebner, Jr. ........................ | 206/409 X |
| 4,068,247 | 1/1978 | Bouwen et al. ................. | 242/71.1 X |
| 4,212,389 | 7/1980 | Robbins .......................... | 206/409 X |
| 4,865,196 | 9/1989 | Buelens et al. ................. | 206/409 |
| 4,913,368 | 4/1990 | Atkinson et al. ............... | 206/409 X |
| 4,928,826 | 5/1990 | Shibazaki et al. .............. | 206/409 |
| 4,931,819 | 6/1990 | Atkinson et al. ............... | 242/71.1 |
| 4,978,985 | 12/1990 | Smart et al. .................... | 242/71.1 X |

*Primary Examiner*—Steven N. Meyers
*Assistant Examiner*—Ted Kavanaugh
*Attorney, Agent, or Firm*—William J. Daniel

[57] ABSTRACT

A cassette for light-tightly holding and dispensing a roll of web material, e.g. photographic film, which has a peripheral dispensing slot in its shell for passage of the web therefrom, which slot is formed by generally radially directed re-entrant lips lined with light-sealing strips to seal the slot against penetration by light, the sealing strips being adhered to the mutually facing surfaces of the lips by layers of adhesive on their backsides, preferably a pressure-sensitive adhesive, wherein the innermost edge of each of the adhesive layers is in a radially outwardly retracted position relative to the innermost edge of the associated sealing strip, leaving a short inner marginal portion of the sealing strip free of adhesive and overlying the inner edge of the adhesive layer to conceal and shelter the adhesive edge against possible contact with the exiting web. The non-adhered inner margin, and preferably a short outermost portion of each sealing strip as well, is reinforced to increase its stiffness, as by means of a coating of a polymer.

9 Claims, 5 Drawing Sheets

LIGHT-TIGHT CASSETTE

This application is a continuation of application Ser. No. 07/670.020, filed Mar. 15, 1991, abandoned.

BACKGROUND OF THE INVENTION

1. Field of the invention

The present invention relates to a light-tight cassette or magazine (hereinafter called "cassette") for holding and dispensing a roll of light-sensitive photographic material.

The invention is particularly suitable for use with phototype-setting apparatus.

2. Description of the prior art

Cassettes in the form of a generally rectangular box having a peripheral light-tight slot via which light-sensitive material can be drawn from a roll located in the box are known. The light-tightness of the dispensing slot is important for preventing light from entering the cassette and fogging outer convolutions of the roll of light-sensitive material during the removal of the cassette from its wrapper and during day-light loading or unloading of the cassette into or from a photographic exposure apparatus.

Most present-day cassettes are made from plastics or cardboard. The peripheral wall or shell of the cassette has in-turned plastic or cardboard lips forming the dispensing slot, and light-tight sealing of this slot is commonly effected by elastically deformable linings, more particularly, strips of velvet. These strips are adhered to the lips by means of glue, in particular a pressure-sensitive, also called self-adhesive glue, provided at the backside of the light-sealing strips.

The described glue can sometimes cause difficulties, in particular at the first pulling out of a length of a fresh roll of photographic film or paper. As a matter of fact, it may happen that the film comes into contact with the longitudinal edge of a light-sealing strip at the inside of the cassette and thereby touches and adheres to the corresponding edge of adhesive that is exposed at such place. The exposed edge of adhesive may have been caused by an excessive pressure during the application of the light-sealing strip to the lip, by a layer of adhesive that is too thick, by creeping behaviour of the adhesive, etc.

Pulling-out a film which has become adhered too the adhesive becomes difficult, and increased effort by the operator, in order to obtain a length of film sufficient for the proper insertion of the film in the nip of the transport rollers of an exposure apparatus, aggravates the situation still more and finally may cause the film to bend back a marginal portion of the light sealing strip from the lip whereby this strip portion enters the dispensing slot and blocks any further movement of the film.

It is believed there are two important causes for the described defect.

First, the film as it is drawn from the roll and enters the dispensing slot of the cassette, follows different angular directions depending on the extent to which the roll has been used. The limits of the range of different directions are formed by the film paths that are tangent to a fresh or a full roll at one extreme, and to an empty roll at the other. The dispenser slot can accept a wide range of paths since the lips of the slot usually will diverge or flare inwardly, i.e. in the direction towards the roll, but it will be understood that for the extreme film directions as described, the angular clearance between a light sealing strip and the oncoming film is small, and thus minor deviations of the film from its straight path may suffice for bringing the film in contact with the radially inwardly edge of the light-sealing strip and then with the edge of the adhesive backing layer itself. A well-known cause of film deviation from its straight path from the roll towards the dispensing slot is partial unwinding of the roll of film under the influence of vibrations that may occur during the transport of the cassette.

Second, there are known cassettes in which the premature unwinding of the film roll during the transport is prevented by a locking member or key that locks the rotation of the core prior to the first use of the cassette. In one form, such locking member is ruptured by the operator when pulling out a certain length of film from the cassette, which causes overtensioning of the member and eventually its rupturing. It has been shown that when the key finally breaks and the film resistance drops, the first pull by the operator is often too strong so that an important slack is produced in the film end between the roll and the dispensing slot which may cause the film to touch the edge of one or both light-sealing strips, and thereby also an edge of the adhesive layer.

It is possible to increase the curvature or divergence of the inner ends of the lips of the dispensing slot in order to widen the entrance opening for the film, but this is not desirable in practice since it complicates the correct application and glueing of a light-sealing strip to the lips.

SUMMARY OF THE INVENTION

Object of the invention

It is the object of the invention to provide an improved cassette of the type referred to, which reduces the risk of a rolled web of paper or film to come into contact with adhesive near or on the inner edges of the light-sealing strips in the dispenser slot.

It is also an object of the invention to improve the light-tightness formed by opposed light-sealing strips in the dispenser slot of a photographic cassette.

Statement of the invention

According to the present invention, a cassette for light-tightly holding and dispensing a roll of web material, which comprises a casing having a shell and two end walls carries means for rotatably supporting a roll of web material, the shell having a peripheral dispenser slot through which the web can be pulled from the roll, the slot being defined by two opposed re-entrant lips to each of which a light-sealing strip is adhered by an adhesive layer on its backside, is characterized thereby that at least one light-sealing strip is free from adhesive on a radially inward marginal portion thereof.

The term "margin" should be interpreted broadly, and covers a radially inward longitudinal end zone of a strip having a width ranging between 5 and 40% of the total width of the strip.

It has been shown that because the radially inward edge of the adhesive layer is located in an outwardly radially retracted position relative to the radially innermost edge of the sealing strip, that is, because the adhesive layer between the sealing strip backside and the lip surface stops short of the innermost edge of the sealing strip by a short length of the strip of about 1-5 mm, leaving that short length non-adhered to the lip surface, and thus has its innermost edge hidden or sheltered by the overlying non-adhered marginal portion of the sealing strip, the described measure completely avoids the problem of undesired adherent contact of the film with the adhesive layer of the light-sealing strips or linings of the dispenser slot. Yet, there is no detrimental effect on the satisfactory adherence of the strips since in spite of the smaller adherent surface, the remaining adherent surface may be situated completely or almost so within the region where the lips run parallel with each other, and the strips exhibit compression forces as a consequence of their mutual contact in the slot gap.

According to a suitable embodiment of the invention, both light-sealing strips are free from adhesive on radially innermost marginal portion thereof.

According to a further suitable embodiment of the invention, the light-sealing strip(s) is (are) strips of velvet.

According to another suitable embodiment of the invention, the radial extent of a non-adherent margin of a strip is within 1 and 5 mm.

According to a further embodiment of the invention, the stiffness of a non-adherent margin of a light-sealing strip is increased whereby such margin is capable of exercising an increased resistance against bending by the contact with the dispensed web, whereby the light-tightness is further improved.

The measures which have been described so far were directed primarily to the radially innermost margins of the light-sealing strips of the dispenser slot, but it should be understood that they may be applied as well to the radially outermost marginal portions of the sealing strips that are adjacent the outside end of the slot. More particularly, if also the outside margins of the light-sealing strips are free of adhesive and if their stiffness is increased, they too may supplement the light-tight sealing of the dispenser slot.

A suitable way of increasing the stiffness of the non-adhering margins of the light-sealing strips, is to apply to the backside of said margins one or more coatings of a polymer or the like which firmly adheres to the strip and which after drying produces a resislient layer with a non-tacky surface. The elasticity of the coated layer is thus added to the elasticity of the strip itself, and by appropriate choice of the composition and/or thickness of such layer, the desired increase of stiffness of the free margin of the strip may be obtained.

It is possible to apply the described coating over the full width of the light-sealing strips, and then to overcoat this coating with a layer of a self-adhesive glue, the width of such layer being smaller so as to leave non-adhereing, uncoated margins.

BRIEF DESCRIPTION OF THE DRAWINGS

The invention will be described hereinafter by way of example with reference to the accompanying drawings wherein:

FIG. 6b is a side elevation detail view of a light-sealing strip of the dispenser slot of FIG. 6a in which the left end corresponds to the innermost end of the strip and the right end the outermost end thereof.

Referring to FIG. 1, a rectangular cassette 10 for holding a roll of light-sensitive photographic material comprises a shell portion 11 and two end caps 12 and 13 with a casing axis which extends between the two end caps generally perpendicular thereto. A film 14 of photographic material may be drawn from the cassette through a light-tight dispenser slot 15 that extends between the end caps over the full length of the shell and may be situated close to a corner portion of the shell. The photographic material has been illustrated as being transparent in the figure. The shell portion of the cassette may be manufactured from plastic or paperboard whereas the end caps may preferably be made from plastic by injection-moulding or by thermo-vacuum forming.

FIG. 2 illustrates a vertical longitudinal section of the cassette along line 2—2 of FIG. 1. The end caps have central hyb portions 16, 17 formed by central portions upset from the wall of the caps terminating in circular end faces 18 and 19. The hub portions have a slight conical form and they rotatably support a hollow core 20 onto which a roll 21 of the light-sensitive film 14 is wound. The core is a tubular body that is suitably made from paperboard or plastic.

Figure 1:
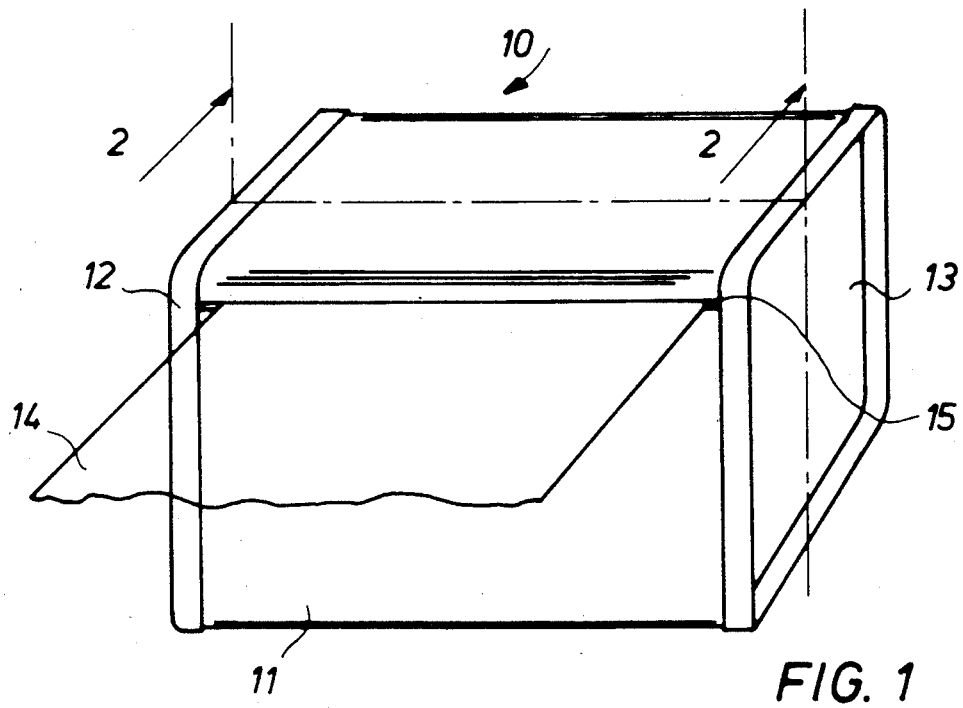
FIG. 1 is a perspective view of one embodiment of a cassette according to the invention.

The end caps 12 and 13 may have inner and outer peripheral flanges as at 22 and 23, defining a peripheral groove for light-tightly receiving an end of the shell 11. The fixing of the end caps to the shell may be done by glueing, by taping or by stapling. The end caps may further be provided with radial ribs for increased rigidity, and with corner guide portions with sloping flanks for facilitating the assembly of the shell and the end caps, all as known in the art.

The core 20 may be locked against undesired rotation in the cassette by means of a locking member in the form of an elongated member 25 that extends from the core 20 into the hub portion 17.

The locking member 25 is made of a flat generally rigid sheet material having a first end portion 27 that is frictionally engaged by the core 20 and a second tongue-shaped end portion 28 that engages in a slot 26 in the hub. These end portions are interconnected by a zone 29 of reduced width.

Further details about the construction of the described locking member may be found in U.S. Pat. No. 4,403,845 entitled "Cassette for holding and dispensing a roll of web material".

Figure 2:
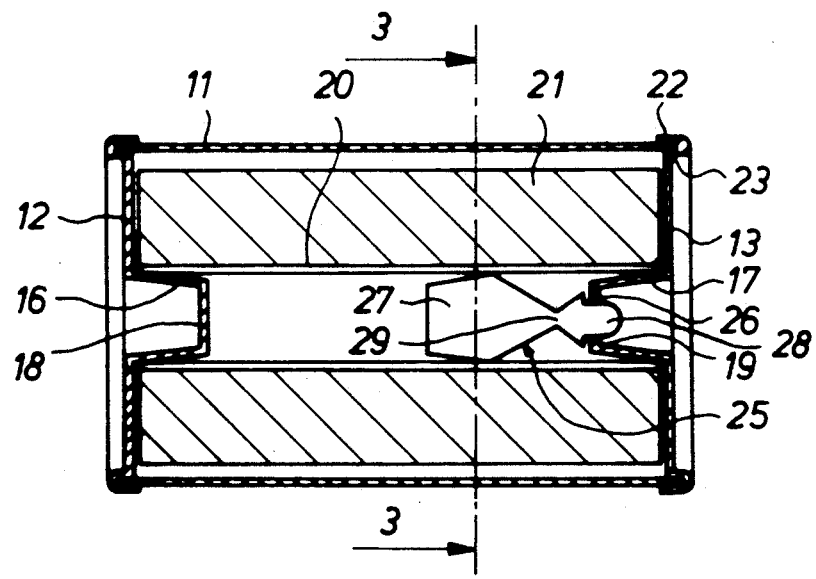
FIG. 2 is a vertical longitudinal section taken along the plane indicated by the line 2—2 of FIG. 1.
Figure 3:
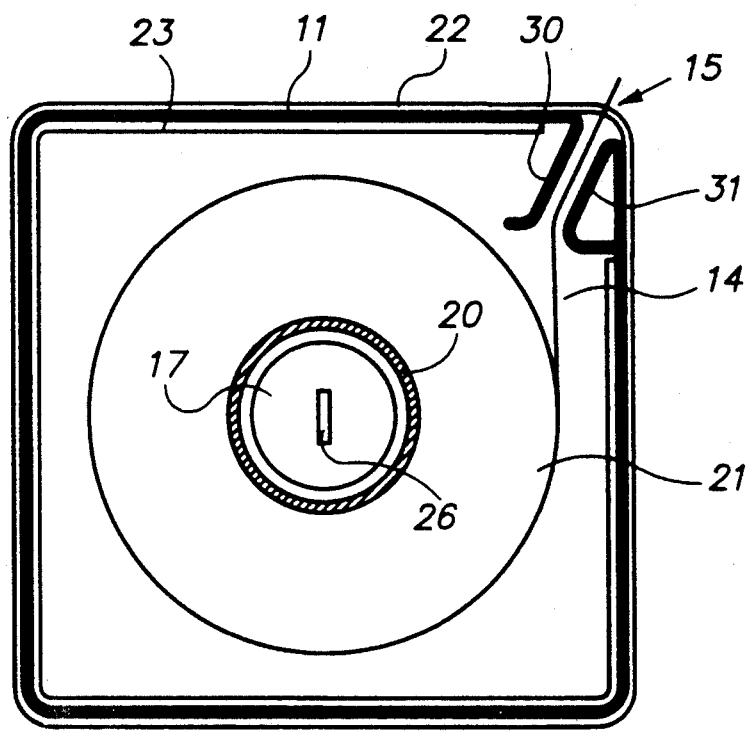
FIG. 3 is a cross-sectional view on line 3—3 of FIG. 2.
Figure 4:
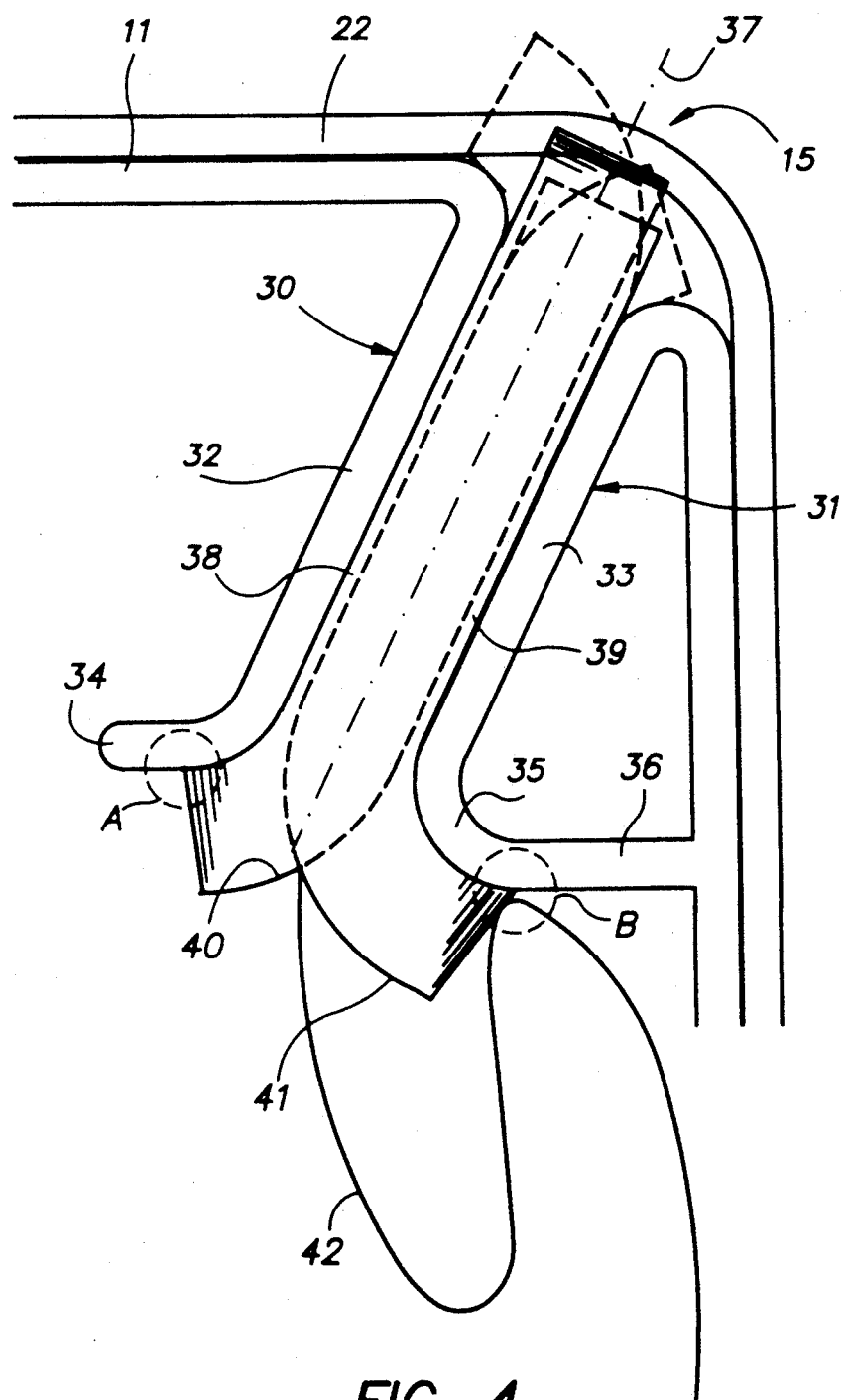
FIG. 4 is an enlarged view of the dispenser slot of the illustration of FIG. 3.

FIG. 3 is a cross-sectional view on line 3—3 of FIG. 2, the locking member 25 being omitted, and FIG. 4 is an enlarged view of the dispenser slot in the illustration of FIG. 3, for a prior art cassette.

Referring to FIG. 4, the two lips 30 and 31 of the shell 11 are formed by end portions of the shell which are angled inwardly of the shell. The lips have parallel sections 32 and 33, and diverging end sections 34 and 35. The end section 35 is connected through a wall section 36 with the side wall of the shell thereby to form a beam-like member that increases the rigidity of the lip. The general direction of the pulling-out of a film in use of the cassette is indicated by the dash and dot line 37. The lips are provided with light-sealing strips 38 and 39, in the present example strips of velvet, that are stuck to the lip surfaces by means of a layer of a pressure-sensitive glue provided on the backside of the strips.

The term "velvet" refers in the present example to a clothlike material comprising pile warps of polyamide or the like, fitted to a ground warp. The piles may be fluffed, looped, or a mixture of both types.

The strips of velvet have been drawn somewhat staggered according to their width direction, i.e. in the direction of withdrawal of the film from the cassette. This has been done in the drawing mainly with the aim of easier recognition of the individual positions of the strips. In practice, the strips may coincide with each other, be slightly staggered, and they may even have different widths.

The drawing shows how the strips overlap each other over a large extent, according to their thickness. This feature occurs in practice since the piles of both opposed strips interengage and compress each other, and ensure in this way the light-tight sealing of the dispenser slot 15.

The longitudinal margins 40 and 41 of the strips 38 and 39 follow the curvature of the lip to which the strips are stuck, and this requires the application of extra pressure to make these margins adhere sufficiently to the lips. It should be noted that at these positions there is also no counter pressure from an opposed strip, as distinct from the parallel sections of the strips where the compression forces between the lips contribute to the good adherence of the strips to the lips.

The troublesome regions of the dispenser slot are indicated by the broken circles A and B. Indeed, it is at these locii that pressure-sensitive compound may become exposed to the exterior and liable to be contacted by a loop in a slack of the film, as illustrated diagrammatically by the film loop 42.

Figure 5A:
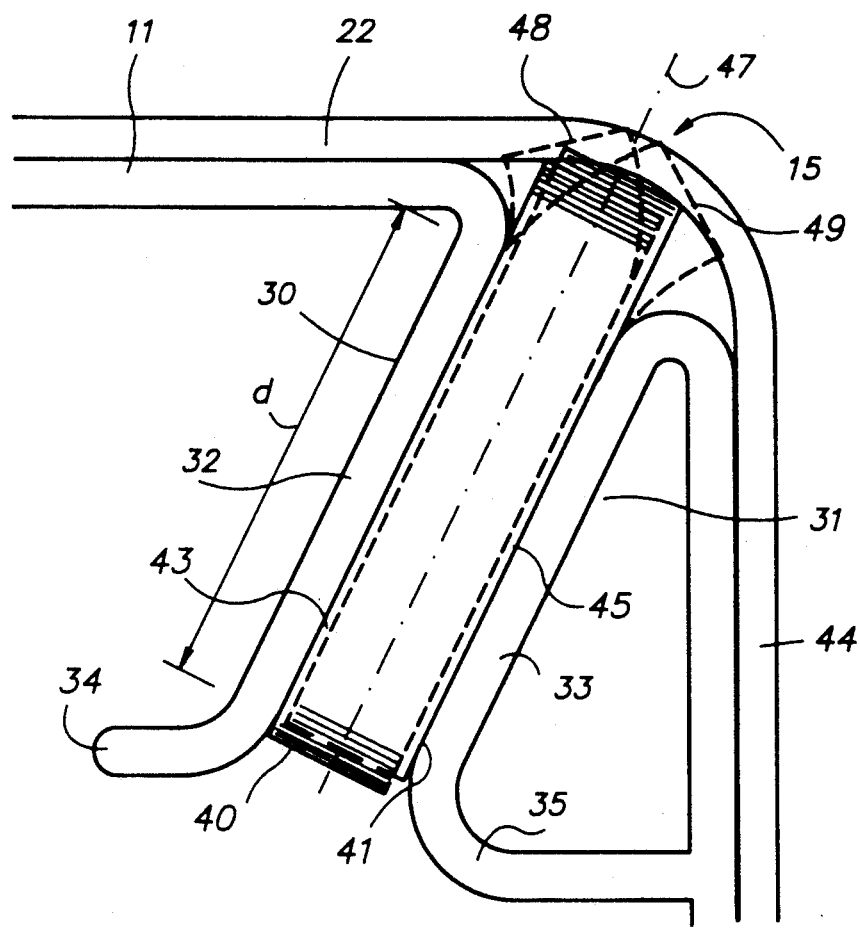
FIG. 5a is an enlarged view of the dispenser slot of one embodiment of a cassette according to the invention.

One embodiment of a cassette according to the invention for avoiding the described defect, is illustrated in FIG. 5a.

Two light-sealing strips 43 and 45 of velvet are adhered to a portion of the parallel sections 32 and 33 of the lips 30 and 31 of the cassette. The strips are not adhered over their full radial extent, i.e. the dimension parallel to the film path, since both their inner and outer end marginal bands are free from pressure-sensitive adhesive.

Figure 5B:
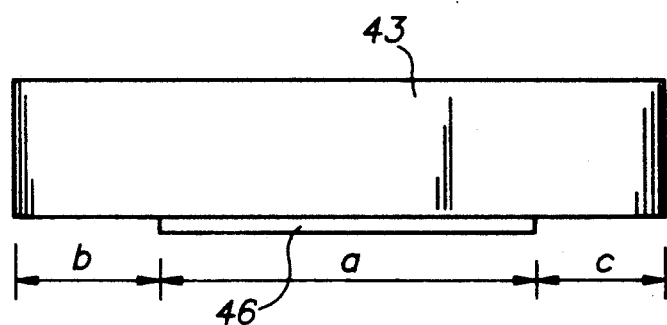
FIG. 5b is a side elevation detail view of a light-sealing strip of the dispenser slot of FIG. 5a, in which the left end corresponds to the innermost end of the strip and the right end the outermost end thereof.

Referring to FIG. 5b, the strip 43 is shown as bearing a pressure-sensitive backing layer 46 of a dimension that is foreshortened at each of its ends compared to the full radial dimension of the sealing strip by the length b or c. Hence, the inner and outer edges of the adhesive layer are each in a retracted position relative to the inner and outer edges of the sealing strip itself. The back surface of the end margins b and c of the strip are free of adhesive and the non-adhered marginal end portions overly the retracted end edges of the adhesive layer and conceal and shelter the same from the possibility of contact with the exterior, e.g. a meandering section of the film. The distance a+c is about equal to the width d of the parallel section of the lip 32. The strip 45 is identic to strip 43.

The illustration of FIG. 5a shows that the strips do not extend inwardly beyond the parallel section of the dispenser slot at the interior end of the slot, and thereby their inner side margins are firmly in contact with the lip surface, also in the absence of any adhesive.

The marginal strip portions at the exit end of the dispenser slot, on the contrary, extend freely and will take thereby a position that differs from the illustrated one which is a theoretical illustration only. It will be understood that a web of film or paper that is pulled through the slot, approximately along a path as illustrated by the dash-and-dot line 47, will considerably increase the pressure on the piles of the strips of velvet so that at those places where the strips are not supported, they will be urged away. This means that the outside margins of the strips will take a position that has a divergent form, as illustrated in broken lines 48 and 49.

The function of the outside margins of the strips of velvet is twofold.

First, and as known in the art, the provision of a surface that shows a reduced frictional contact with the film as the film is pulled from the cassette according to a direction that deviates from that of the direction 47. This situation is not uncommon, since in many exposure apparatus, the withdrawal direction or the film runs nearly parallel with the side wall 44 of the cassette.

Second, and this is new in the art, to make the outside margins of the light-sensitive strips operate as flaps that are in resilient contact with the film and thereby lengthen or extend, so to say, the light-seal which is formed by the parallel lip portions. This light-seal is particularly important at the moment an operator pulls out a length of film from the cassette in order to prepare it for the daylight loading of an exposure apparatus.

The elasticity of commonly used strips of velvet is limited, and so may be the improvement which is offered by the free margins of the light-sealing strips just described.

Therefore, according to another embodiment of the invention, the stiffness of the freely extending margins of the light-sealing strips is enhanced by the application of a flexible, tough layer to their backsides.

Figure 6A:
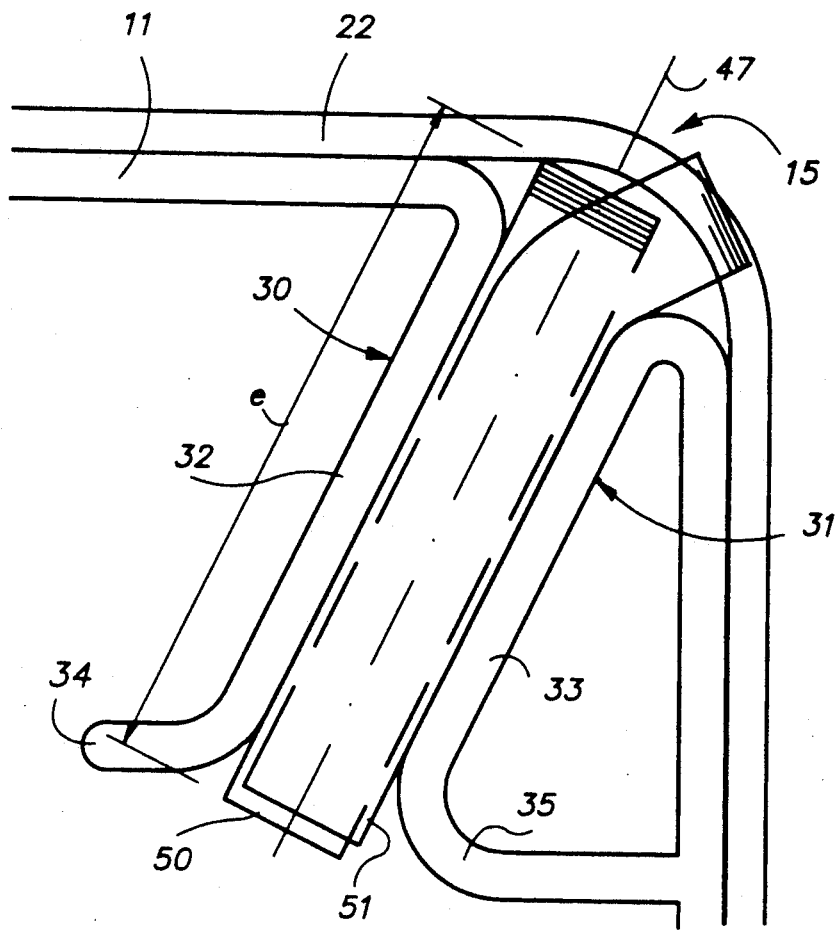
FIG. 6b is an enlarged view of the dispenser slot of another embodiment of a cassette according to the invention.

Referring to FIG. 6a, a cassette mouth is illustrated which is provided with two light-sealing strips 50 and 51, which are stuck to the parallel sections 32 and 33 of lips 30 and 31. The width e of the strips is such that they extend with both their margins beyond the straight sections of the lips of the shell. The strip 50 is illustrated separately in FIG. 5b. The central zone 52 of the strip has a width f which corresponds approximately with the width of the straight portion 32 of the lip 30, and carries on said zone a pressure-sensitive layer 53 on its backside. The marginal zone 54 of the strip which is located at the inside of the cassette is provided with a tough layer 55 of a non-adhesive compound which adds its stiffness to that of the strip so that the final stiffness of the strip margin increases. The opposite marginal zone 56 of the strip is provided with a layer 57 which is similar to the layer 55, whereby this margin gets an enhanced stiffness as well.

The effects of the described sealing strips are as follows. The absence of any pressure-sensitive adhesive at or near the edges of the light-sealing strips excludes the risk for the film that is pulled from the cassette to get occasionally into contact with such adhesive.

Further, an increased resistance against flexure of the strip margins that freely extend at either side of the dispenser slot, contributes to the light-tight sealing of the dispenser slot since the free margins increase in fact the width of the dispenser slot.

The leading end of the roll of film that protrudes from the dispenser slot of the cassette is usually fixed to a wall of the shell by means of a label or the like, and the cassette is then wrapped in a moisture- and air-tight bag or envelope that protects the photographic material.

At the first use of a cassette, the operator removes the protective wrapper from the cassette and then breaks the sealing label and pulls the leading end of the film until a clearly audible click signals the rupturing of the locking member at zone 29, so that the roll is now free to rotate and thus the cassette is ready for loading in the exposure apparatus.

The first pull by the operator on the leading film end in order to unlock the roll of the cassette often is considerably stronger than required, and this causes an acceleration of the roll of wound film which is so large that the roll continuous to rotate for some revolutions after the withdrawal of the film has stopped. This causes an important slack in the outer film windings and in the film path from the roll towards the dispenser slot, which may conduct to the situation as illustrated tentatively in FIG. 4. It has been shown that a cassette with a dispenser slot arranged in accordance with the present invention never produces any problem due to contact of the film with traces of adhesive on the light-sealing strips.

One example of a cassette according to the present invention was provided with light-sealing strips of velvet, with a pile height of 2.45 mm, a width of 17 mm, and a pressure-sensitive backing layer in accordance with the FIG. 5b embodiment which left margins of 3 mm free from adhesive.

The present invention is not limited to the described embodiments.

Figure 6B:
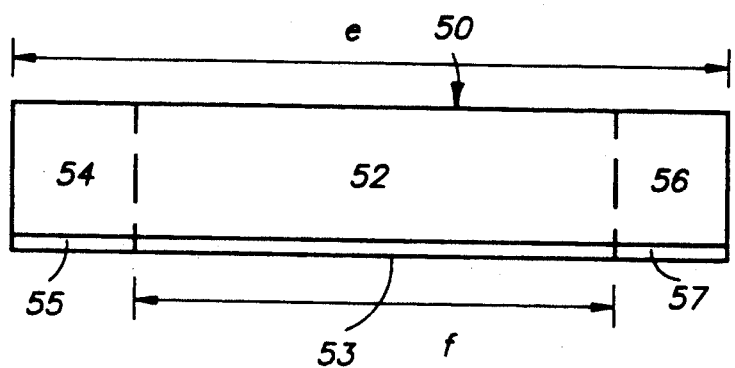

A sealing strip with the characteristics as illustrated in FIG. 6b may also be obtained by providing a layer of a stiffness-enhancing compound uniformly over the complete width of the strip, and by applying thereon a layer of a pressure-sensitive adhesive which leaves free at least one margin of the strip.

The locking of the core prior to the first use of the cassette need not necessarily occur according to the disclosed example, but may also be performed by means of a locking pin or the like which must be removed at the moment of first use. We refer to EU A1 0 263 538 entitled "Light-tight cassette and method for packing rolls of light-sensitive material in a cassette", wherein an example of such different locking system is disclosed.

The shell of the cassette may have other configurations than the illustrated square form, and thus shells with a D-like, a polygonal cross-section or the like, fall within the scope of protection of the present invention as well.

The opposed lip sections of the dispenser slot of the cassette must not necessarily be straight, but may also be curved in the direction of withdrawal of the film, thereby to enhance the light-tightness of the exit slot.

The rigidity of the lips of the dispenser slot may be increased by the provision of a suitable elongate stiffening member that increases the resistance of a lip to bending forces which may tend to widen the slot. This improvement forms the subject of EU A1 0 298 536, published Jan. 11th, 1989 and entitled: "Light-tight cassette for light-sensitive photographic material".

We claim:

1. A cassette for lightly-holding and dispensing web material from a generally cylindrical roll of such material, which comprises a generally rectangular casing having a peripheral shell which is generally rectangular in cross-section and two end caps closing the ends of said shell and carrying means for supporting the roll of web material within the casing for rotation about a casing axis which extends between the two end caps generally perpendicular thereto, said shell having substantially adjacent one of its corners a peripheral dispensing slot stretching axially between said end caps through which the web can be withdrawn from the roll to the exterior of the casing, said slot being defined by two opposed generally parallel lips extending inwardly of the shell in a direction generally radially of said casing axis, and light sealing means in said slot, said light-sealing means comprising a light-sealing strip which is mounted on each of the mutually facing surfaces of said lips and has an inner edge and an outer edge, said inner edge being closer to the casing axis than said outer edge, each said light-sealing strip being adhered to the lip surface on which it is mounted by an adhesive layer, said adhesive layer being interposed between the strip and the lip surface and having any inner edge and an outer edge, said inner edge being closer to the casing axis than said outer edge, wherein said inner edge of at least one of said adhesive layers is spaced farther away from the casing axis than is said inner edge of the light-sealing strip adhered by said layer, whereby a marginal portion of the light-sealing strip stretching between the inner edge of the adhesive layer adhered thereto and the inner edge of the strip itself projects inwardly towards said casing axis beyond the inner edge of said adhesive layer and shields the inner edge of said adhesive layer from accidental contact with the web being withdrawn.

2. The cassette according to claim 1 wherein at least said marginal portion of said light-sealing strip is reinforced to increase its stiffness.

3. The cassette according to claim 2 wherein said light-sealing strip is reinforced by the application of a coating to the surface of at least said marginal portion thereof which faces the lip surface to which such strip is adhered.

4. The cassette according to claim 2 wherein at least said one light-sealing strip has an outer marginal portion projecting away from said casing axis outside the casing shell and at least said the projecting outer marginal portion is also reinforced to increase its stiffness.

5. The cassette according to claim 2 wherein the adhesive of said adhesive layer is a pressure-sensitive adhesive.

6. The cassette according to claim 1 wherein the dimension of the projecting marginal portion of said light-sealing strip is in the range of about 1-5 mm.

7. The cassette according to claim 1 wherein said two opposed generally parallel lips terminate at their ends closer to said casing axis in diverging extensions forming a mouth for the slot and said light-sealing strips terminate at their inner edges on the parallel lips.

8. The cassette according to claim 7 wherein the outer ends of the light-sealing strips project away from said casing axis exteriorly of the casing.

9. The cassette according to claim 1 wherein said two opposed generally parallel lips terminate at their ends closer to said casing axis in diverging extensions forming a mouth for the slot and eachof said light-sealing strips extends in generally planar relation towards said casing axis beyond the inner end of the parallel lip on which it is mounted to forma free inner marginal portion.

* * * * *